E. LUNDGREN.
WATER REGULATOR FOR SUCTION GAS PRODUCERS.
APPLICATION FILED NOV. 1, 1909.
985,818.
Patented Mar. 7, 1911.
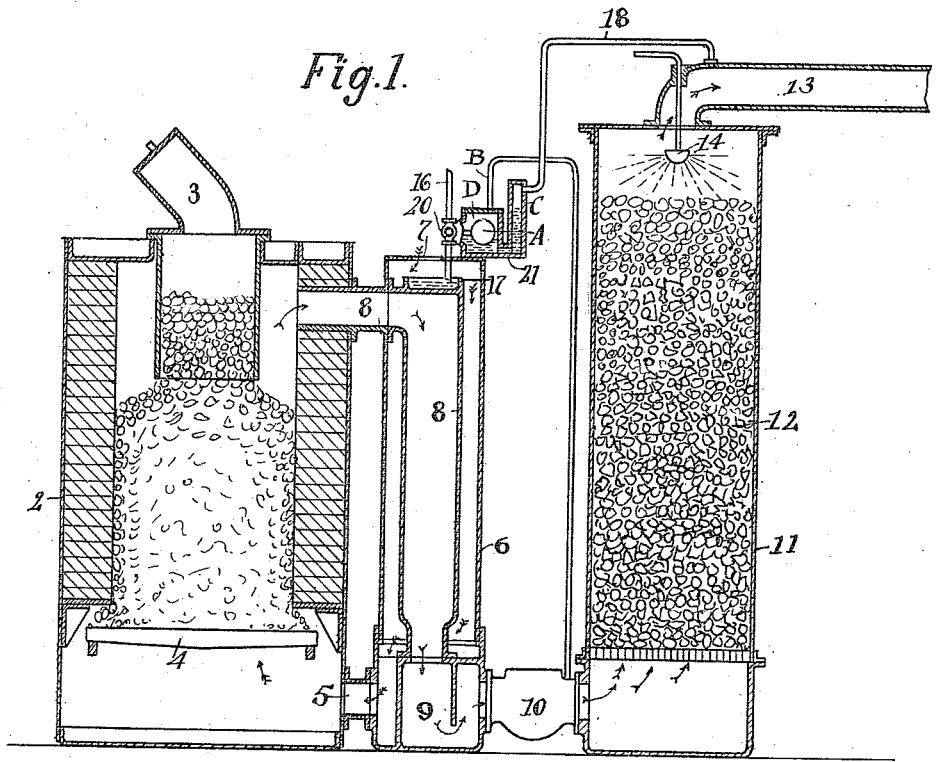
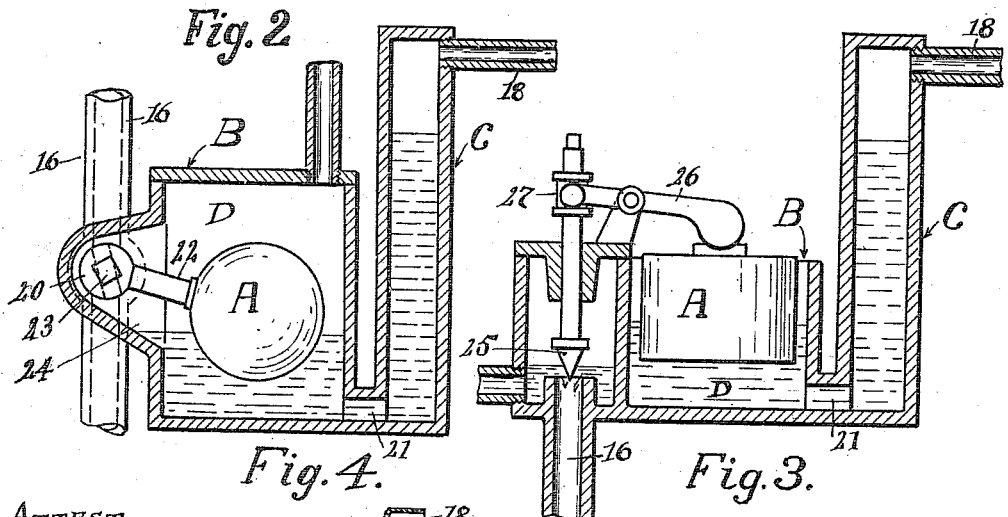
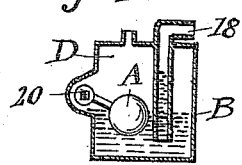
ATTEST
E. M. Fisher
J. C. Mussun
INVENTOR
Edwin Lundgren
By Fisher Ferrost
attys

UNITED STATES PATENT OFFICE.

EDWIN LUNDGREN, OF WARREN, PENNSYLVANIA.

WATER-REGULATOR FOR SUCTION GAS-PRODUCERS.

985,818.  Specification of Letters Patent.  Patented Mar. 7, 1911.

Application filed November 1, 1909. Serial No. 525,667.

*To all whom it may concern:*

Be it known that I, EDWIN LUNDGREN, citizen of the United States, residing at Warren, in the county of Warren and State of Pennsylvania, have invented certain new and useful Improvements in Water-Regulators for Suction Gas-Producers, of which the following is a specification.

My invention relates to water regulators for suction gas producers, and the invention is an improvement consisting of a combination and arrangement of parts substantially as herein shown and described and more particularly pointed out in the claims.

As generally known, a certain amount of water or steam is required in gas producers to make a serviceable gas for power purposes, and particularly for combustion engines. The amount of water used must be proportionate to the amount of gas used, otherwise the composition of the gas will change under varying conditions of use.

My object is to provide a water regulating device and connections therefor leading to the gas producer and its vaporizer and scrubber so that the suction of the outflowing gases will automatically regulate the flow of water in proportion to the amount of gas used and thereby maintain the composition of gas at its most desirable state for consumption regardless of varying conditions at the engine.

In the accompanying drawings, Figure 1 is a sectional view on a reduced scale of a gas producer or generator and a vaporizer and scrubber, showing my improved water regulating means associated therewith. Fig. 2 is a sectional view of the water regulating device shown in Fig. 1 and enlarged as compared therewith. Fig. 3 is a modified form of water regulator, as is also Fig. 4.

The gas producer or generator 2 shown in Fig. 1 is charged through its top 3 and the air supply therefor is taken in at its bottom beneath grate 4 through pipe 5 which connects with a so-called vaporizer 6. The air is drawn through vaporizer 6 from top to bottom, intake of air being had at opening 7 in its top, and the air is preheated in passing therethrough and at the same time saturated with steam obtained by discharging water into the top of vaporizer 6. Vaporization occurs by reason of the heat taken from the hot gases passing through outlet pipe 8 at the upper end of producer 2, which pipe extends centrally through vaporizer 6 and discharges into exit chamber 9 at its bottom. From this point the gas proceeds through a purge valve 10, or other suitable connection, into the bottom end of scrubber 11, and thence passes upwardly through a body of coke 12 therein, whereby it is cleaned, cooled and washed as usual before passing to the engine through supply pipe 13.

A water spraying device 14 is shown in the upper end of scrubber 11, but as to this and other details of construction of the scrubber, gas producer and vaporizer, no novelty is claimed. However, what I do regard as new and novel and as my invention is the use of a water regulating device B with the foregoing, all constructed, connected and arranged as follows: Thus, referring to Fig. 1, it will be seen that a water supply pipe 16 is arranged to discharge water into an overflow basin 17 at the top of inner pipe 8. This water is thrown off as a vapor as it overflows or runs down the sides of hot pipe 8 and is drawn with the preheated air into the producer 2 by the suction of the engine. As the suction at pipe 13 is variable according to the needs of the engine, I connect a pipe 18 with pipe 13 and also with suction chamber C of regulator B and therethrough operate a valve 20 in water supply pipe 16 to variably control the amount of water discharging into vaporizer 6. Valve 20 is operated by a weighted float A which is preferably housed within larger liquid chamber D of regulator B, also referred to as the float chamber. The smaller and relatively higher liquid chamber C communicates at its bottom through passage 21 with the bottom of chamber D and the flow of liquid is back and forth from one chamber to another through said passage in whatever degree the suction through pipe 18 may determine, thus maintaining varying levels of the liquid in both chambers.

Float A is mounted at the end of an arm 22 fixed to the square valve plug extension 23 which projects into the lateral offset or recess 24 in the side wall of chamber D. Obviously, when the liquid in chamber D rises or falls there is a corresponding movement of float A to close or open valve 20 more or less, and because of the different areas of the respective chambers there is less movement in chamber D than in suction chamber C. The latter chamber is sealed excepting at pipe 18, and chamber D has communication with the atmosphere or with some other parts of producer by pipe 19. The action of regulator B is sensitive and responsive to every change in suction from the engine over lines 13 and 18, and the degree to which valve 20 will admit water to vaporizer 6 is always in proportion to the needs of the engine as expressed by the quantity and quality of the gas obtained from the producer.

The movement of float A and its corresponding action on valve 20 may readily be changed by changing the proportions or areas of the respective chambers C and D, or by adjustments in the valve or float or their connected means. Water or any other suitable liquid may be used within regulator B.

In operation, the steam or vapors derived from the water from pipe 16 are commingled with the preheated air in the proportion desired and drawn through the fuel bed of the producer where the mixture combines with the carbon of the fuel to form a gas. This gas in passing off through pipe 8 is hot, but is cooled off while passing through vaporizer 6 and is still further cooled as it proceeds through the scrubber, or scrubbers, where it is also cleaned and washed before going to the engine. If no gas is being consumed there is no suction on the line and the liquid in both chambers of regulator B will be on the same level, thus cutting off the flow of water through pipe 16.

In Fig. 3 a modified form of regulating device is shown which differs in a few particulars from the device hereinbefore described. Thus a needle valve 25 is substituted for the plug valve in the other and a tilting lever 26 fulcrumed near its middle is engaged at one end with the flanged spindle 27 of valve 25 and at its other end with float A which is free to rise and fall within an open float chamber D.

In Fig. 4, the suction pipe 18 leads directly into chamber D and takes the place of chamber C, but otherwise the construction is substantially the same as shown in Fig. 2.

What I claim is:

1. In combination with a gas producer combined air and steam applying devices therefor comprising a tube to convey the air and a vaporizer to produce the steam within said tube, in combination with a water regulator mechanism comprising two fluid chambers of different areas open to each other, a gas discharge pipe and a suction connection uniting said pipe with the smaller of said chambers, a float within the larger of said chambers and a water supply pipe and a valve therein operatively connected with said float adapted to variably control the water supply to said vaporizer and eliminate friction in the valve operating means.

2. In combination with a gas producer and a gas discharge line therefrom, a water regulating device having two fluid chambers of relatively different areas communicating at their bottom and adapted to contain a liquid, a gas scrubber and a discharge connection therefrom at the top, a suction pipe uniting said discharge connection with the smaller of said chambers and a float in the other chamber, and a water supply line for the producer and a valve therein operatively connected with said float, whereby the position of the said valve is determined by the state of the fluid in said float chamber.

3. A gas producer and a scrubber for the gas and suction connections for the gas between said parts, a water vaporizer in the line of said gas and said suction connections, and a water supply pipe for said vaporizer, in combination with an air preheating intake for said producer, a water regulator comprising a valve in said water supply pipe, a fluid chamber and a float in said chamber operatively connected with said valve, a suction chamber open to said fluid chamber and suction connections between said suction chamber and the suction connections for said producer.

In testimony whereof I affix my signature in presence of two witnesses.

EDWIN LUNDGREN.

Witnesses:
K. A. KRANTZ,
H. G. SANDBLADE.

---

Copies of this patent may be obtained for five cents each, by addressing the "Commissioner of Patents, Washington, D. C."